(12) United States Patent
Nakabayashi et al.

(10) Patent No.: US 8,878,719 B2
(45) Date of Patent: Nov. 4, 2014

(54) RADAR APPARATUS PROVIDED WITH SERIES-FEED ARRAY-ANTENNAS EACH INCLUDING A PLURALITY OF ANTENNA ELEMENTS

(75) Inventors: Kento Nakabayashi, Anjo (JP); Tetsuya Katayama, Aichi-ken (JP); Shin-ichiro Matsuzawa, Nisshin (JP); Masaru Ogawa, Seto (JP)

(73) Assignee: Denso Corporation, Kariya (JP)

( * ) Notice: Subject to any disclaimer, the term of this patent is extended or adjusted under 35 U.S.C. 154(b) by 339 days.

(21) Appl. No.: 13/199,441

(22) Filed: Aug. 30, 2011

(65) Prior Publication Data
US 2012/0050094 A1    Mar. 1, 2012

(30) Foreign Application Priority Data

Sep. 1, 2010 (JP) .................................. 2010-196163

(51) Int. Cl.
*G01S 7/40* (2006.01)
*G01S 7/03* (2006.01)
*G01S 7/35* (2006.01)
*H01Q 3/26* (2006.01)
*H01Q 21/00* (2006.01)

(52) U.S. Cl.
CPC ... *G01S 7/03* (2013.01); *G01S 7/35* (2013.01); *G01S 7/4052* (2013.01); *G01S 2007/4069* (2013.01); *H01Q 3/267* (2013.01); *H01Q 21/0006* (2013.01); *G01S 7/4008* (2013.01)
USPC ........................... 342/174; 342/173; 342/165

(58) Field of Classification Search
CPC ..... H01Q 3/267; G01S 7/4021; G01S 7/4004; G01S 7/4026; G01S 13/931
USPC .................................. 342/81, 165, 174, 204
See application file for complete search history.

(56) References Cited

U.S. PATENT DOCUMENTS

RE29,911 E * 2/1979 Munson ................. 343/700 MS
5,027,127 A * 6/1991 Shnitkin et al. ............... 342/372
(Continued)

FOREIGN PATENT DOCUMENTS

CN    1150499    5/1997
CN    1353886    6/2002
(Continued)

OTHER PUBLICATIONS

Office action dated Feb. 25, 2013 in corresponding Chinese Application No. 201110265729.8.
Office action dated Dec. 24, 2013 in corresponding Japanese Application No. 2010-196163.
Nishimori, Kentaro et al, "Automatic Calibration Method of Adaptive Array Utilizing Signal Circulation Between Antennas", Technical Research Report of The Institute of Electronics and Communication Engineers, vol. 100, No. 663, pp. 31-36, Mar. 8, 2001.

*Primary Examiner* — John B Sotomayor
*Assistant Examiner* — Marcus Windrich
(74) *Attorney, Agent, or Firm* — Harness, Dickey & Pierce, PLC

(57) ABSTRACT

A radar apparatus forming a series-feed array-antenna includes an array antenna having transmission/reception antennas, and each antenna includes a plurality of antenna elements arrayed with feed-lines to be series-connected each other. A calibration line is disposed between the transmission antenna and the reception antenna via a switch which connects or disconnects the calibration line. The signal having a phase shift is transmitted via the calibration line when the switch connects the calibration line and an amount of phase shift from the signal transmitted via the calibration line is calculated based on a reference phase at the transmission antenna thereby calibrating the phase shift.

11 Claims, 5 Drawing Sheets

(56) References Cited

U.S. PATENT DOCUMENTS

| | | | |
|---|---|---|---|
| 5,063,529 A * | 11/1991 | Chapoton | 702/106 |
| 5,617,103 A * | 4/1997 | Koscica et al. | 343/700 MS |
| 6,157,343 A * | 12/2000 | Andersson et al. | 342/371 |
| 6,252,542 B1 * | 6/2001 | Sikina et al. | 342/174 |
| 7,545,321 B2 * | 6/2009 | Kawasaki | 342/368 |
| 8,154,452 B2 * | 4/2012 | Webb | 342/368 |
| 2003/0142012 A1 * | 7/2003 | Hirabe | 342/173 |
| 2005/0275585 A1 | 12/2005 | Shima et al. | |
| 2006/0044185 A1 * | 3/2006 | Jin et al. | 342/368 |
| 2007/0052581 A1 * | 3/2007 | Shima | 342/173 |
| 2007/0152868 A1 | 7/2007 | Schoebel | |
| 2008/0224916 A1 | 9/2008 | Takagi | |
| 2009/0153394 A1 * | 6/2009 | Navarro et al. | 342/174 |

FOREIGN PATENT DOCUMENTS

| | | |
|---|---|---|
| JP | 2002-162460 | 6/2002 |
| JP | 2006-003097 | 1/2006 |
| JP | 2006-516370 | 6/2006 |
| JP | 2008-051560 | 3/2008 |
| JP | 2008-111750 | 5/2008 |
| JP | 2008-224511 | 9/2008 |
| JP | 2010-197138 | 9/2010 |

* cited by examiner

RADAR APPARATUS PROVIDED WITH SERIES-FEED ARRAY-ANTENNAS EACH INCLUDING A PLURALITY OF ANTENNA ELEMENTS

CROSS REFERENCE TO RELATED APPLICATION

This application is based on and claims the benefit of priority from earlier Japanese Patent Application No. 2010-196163 filed on Sep. 1, 2010 the description of which is incorporated herein by reference.

TECHNICAL BACKGROUND

1. Technical Field

The present invention relates to a radar apparatus, and more particularly to a radar apparatus provided with series-feed array-antennas each including a plurality of antenna elements series-connected by feedlines.

2. Description of the Related Art

In a radar apparatus using an array-antenna, the feeding phase of the antenna elements is shifted due to occurrence of an error when the radar apparatus is manufactured or due to a variation of the ambient temperature. Hence, direction of the radar beam outputted from the array-antenna may be shifted as well. As a result, characteristics of the radar apparatus may be degraded.

In this regard, for example, Japanese Patent Application Laid-Open Publication Nos. 2008-224511 and 2002-162460 disclose techniques used in radar apparatuses such that the phase shift of the radar apparatus is calibrated.

Specifically, the patent document No. 2008-224511 discloses a technique in which leaked waves from the transmission antenna is received by the reception antenna and the phase of the leak waves is stored, and the method compares a phase of radar waves when an object is actually detected with the phase of the leak waves, then extracts an amount of phase-correction for each antenna element and memorize the amount of phase-correction. As a result, the error is calibrated based on the amount of phase-correction every time when the object is detected.

Moreover, the patent document No. 2002-162460 discloses a technique in which a phase difference between the radar waves at a reference antenna and the radar waves at other antennas is detected, and comparing the detected phase difference with estimated phase difference due to temperature variation at other antenna elements, the amount of phase-correction is obtained.

According to a millimeter-wave radar apparatus, to decrease a power loss of the feedline, length of the feedline can be shortened. Hence, it is effective to use a series-feed array-antenna in the millimeter-wave radar apparatus. However, in the series-feed array-antenna, due to occurrence of an error when the series-feed array-antenna is manufactured or due to a temperature variation, an error may occur in the phase of feed (feeding phase) for the respective antenna elements so that a peak angle of directivity is shifted. As a result, performance of the radar apparatus may be degraded. For instance, as shown in FIG. 5, the beam of the radar waves is designed to have a peak of the gain at 0 deg when no error is expected in the radar apparatus. Assuming an error occurs in the radar apparatus so that the peak angle of the directivity is shifted by θ deg, the gain at the 0 deg direction is significantly decreased.

The techniques disclosed by the patent documents Nos. 2008-224511 and 2002-162460 are related to a calibration of an angle-error in the horizontal direction of the radar. Therefore, the correction cannot be made in the vertical direction of the radar. This is because a phase shift of the feeding in respective antenna elements arrayed in the vertical direction cannot be detected and corrected. Also, in the technique disclosed by the patent document 2002-162460, it is necessary to set the reference antenna element and to dispose a standard reflection body in front of the array-antenna in order to detect the initial phase. Therefore, in this technique, the calibration of the antennas cannot be made easily.

SUMMARY

An embodiment provides a radar apparatus in which a series-feed array-antenna is used for transmitting and receiving radar waves and a phase shift of the feeding in each antenna element can be calibrated.

As a first aspect of the embodiment, a radar apparatus forming a series-feed array-antenna is provided. The radar apparatus includes: an array antenna having a transmission antenna and a reception antenna, each antenna including a plurality of antenna elements arrayed with a feedline electrically connected therebetween, in which the transmission antenna radiates a signal from respective antenna elements having mutually different feeding phases among the respective antenna elements so as to generate a radar beam; a calibration line connected between a connection point at the feedline of the transmission antenna and a connection point at the feedline of the reception antenna; a switch connected between the transmission antenna and the reception antenna to connect or disconnect the calibration line therebetween, the signal having a phase shift being transmitted via the calibration line when the switch connects the calibration line; calculating means for calculating an amount of phase shift from the signal transmitted via the calibration line based on a reference phase at the transmission antenna; and calibrating means for calibrating the phase shift calculated by the calculating means. The calibration line is connected between the connection points so as to include at least one antenna element in a signal path from a feeding point at the feedline in the transmission antenna to the connection point at the feedline in the transmission antenna and a signal path from the connection point at the feedline in the reception antenna to a feeding point at the feedline in the reception antenna.

The array antennas, i.e., the transmission antenna and the reception antennas can be configured by any structure of antennas as long as the antenna is configured as a series-feed antenna. Specifically, the feedlines of the transmission antenna and the reception antenna can be configured by a microstrip line, a triplate line, a coplanar line and a waveguide tube. For the antenna elements of the transmission antenna and the reception antenna, a patch antenna, a dipole antenna and a slot antenna can be used. Moreover, the transmission antenna and the reception antenna can be a phased array-antenna in which phase shifters are disposed between the antenna elements. The phase shifters are configured by at least one of a semiconductor device, a MEMS (micro-electric-mechanical system) and variable dielectric constant materials (e.g. ferroelectric material or liquid crystal material).

As to the connection point between the transmission antenna and the calibration line and, the connection point between the calibration line and the reception antenna, the location of the connection points are not limited and can be changed to any locations while the calibration line is connected between the connection points so as to include at least one antenna element in a signal path from a feeding point at the feedline in the transmission antenna to the connection point at the feedline in the transmission antenna and a signal path from the connection point at the feedline in the reception antenna to a feeding point at the feedline in the reception antenna. The connection point of the calibration line can be arranged to any portion considering the influence of radiation from the calibration line itself, phase folding, intensity of the reception signal and the like. Also, the switch can be arranged to any portion considering various influences. When the calibration line affects the radiation of the radar waves so that the characteristics of the radar apparatus is influenced by the calibration line, switches can be disposed at a connection point between the transmission antenna and the calibration line and a connection point between the reception antenna and the calibration line to isolate the calibration line from the reception antenna and the transmission antenna by turning OFF the switches except when the calibration is required. A plurality of transmission antennas or a plurality of reception antennas can be arranged. Since both of the calibration and the normal operation can be performed in parallel, a plurality of reception antennas is preferably used.

Regarding the calibration means, the following plural means can be used. These means can be performed individually or can be performed with any combination thereof. In these calibration means, one means is that the calibration is made by a signal processing based on an amount of phase shift. For instance, the phase shift of the feeding for antenna elements is estimated thereby calculating the shift of beam-direction of the radar beam, and the signal processing calibrates the shift of the beam-direction when calculating location of an object to be measured.

As a second aspect of the embodiment, the switch is disposed at a connection end of the calibration line at the transmission antenna and a connection end of the calibration line at the reception antenna.

As a third aspect of the embodiment, the radar apparatus includes estimating means for estimating a phase shift of the feeding phase at the antenna elements based on the amount of phase shift calculated by the calculating means and detecting means for detecting a direction-shift of the radar beam.

As a fourth aspect of the embodiment, the radar apparatus includes a voltage controlled oscillator i.e., VCO that changes frequency of the signal, and the calibrating means is configured to convert the phase shift calculated by the calculating means to a frequency-shift and control the frequency of the signal being transmitted by the transmission antenna by the VCO so as to perform the calibration.

As a fifth aspect of the embodiment, the transmission antenna and the reception antenna is configured by a phased array-antenna in which phase shifters are disposed between the antenna elements, and the radar apparatus includes estimating means for estimating a phase shift of the feeding at the antenna elements based on the amount of phase shift calculated by the calculating means, and the calibration means calibrates the phase shift of the feeding by changing an amount of phase shift of the phase shifters.

As a sixth aspect of the embodiment, the phase shifters are configured by at least one of semiconductor device, MEMS, ferroelectric material and liquid crystal material.

As a seventh aspect of the embodiment, the feedlines of the transmission antenna and the reception antenna are configured by at least one of microstrip line, triplate line, coplanar line and waveguide tube.

As a eighth aspect of the embodiment, the antenna element used in the transmission antenna and the reception antenna is configured by patch antenna or a slot antenna or a dipole antenna.

According to the first aspect of the embodiment, operating modes can be changed by the switch, that is, the normal operating mode of the radar apparatus and the calibration mode can be switched. In the calibration mode, the signal is received via the calibration line so that the phase shift of the feeding in the respective antenna elements can be estimated. Therefore, degrading of the characteristics in the radar apparatus can be suppressed by calibrating the phase shift of the feeding. According to the first aspect of the embodiment, when a plurality of reception antennas is employed, even when it is in the calibration mode, the reception antennas excluding the reception antenna being connected to the calibration line is able to operate normally. Hence, the above-described radar apparatus is able to perform the calibration to calibrate the phase shift of the feeding as well as the normal operation of the radar function to detect the location or the like of the object to be measured.

According to the second aspect of the embodiment, the calibration line can be isolated from the transmission antenna and the reception antenna when performing the calibration whereby it is suppressed that the characteristic of the radar apparatus being influenced by radiating the electromagnetic waves from the calibration line itself.

According to the fourth aspect of the embodiment, the phase shift of the feeding in the respective antenna elements can be calibrated by a change in frequency of the signal. Moreover, an amount of phase shift can be detected by changing the frequency so that the influence of the phase folding can be reduced. As a result, accuracy of the calibration can be enhanced.

Further, according to the fifth aspect of the embodiment, the phase shift of the feeding can be calibrated by adjusting the amount of phase shift by the phase shifter. As a phase shifter according to the sixth aspect of the embodiment, the phase shifter can be configured by at least any one of semiconductor device, MEMS, ferroelectric material and liquid crystal material.

According to the seventh aspect of the embodiment, the feedlines of the transmission antenna and the reception antenna can be configured by at least one of a microstrip line, a triplate line, a coplanar line and a waveguide tube. According to the eighth aspect of the embodiment, the antenna element used in the transmission antenna and the reception antenna can be configured by a patch antenna or a slot antenna or a dipole antenna.

DETAILED DESCRIPTION OF THE PREFERRED EMBODIMENTS

With reference to the drawings, hereinafter will be described an embodiment of the present invention.
(First Embodiment)

Figure 1:
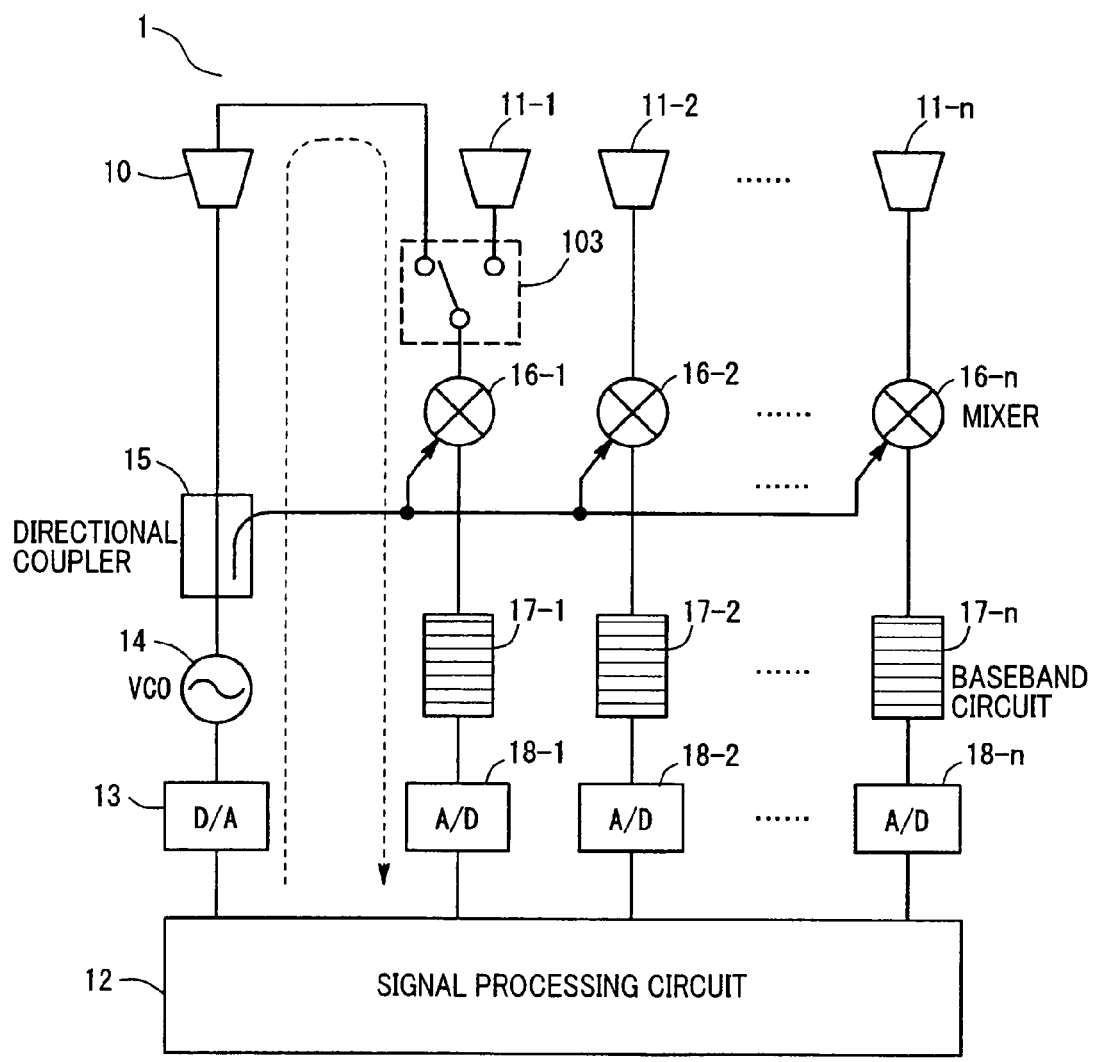
FIG. 1 is a block diagram showing an overall configuration of a radar apparatus according to a first embodiment.
Figure 2:
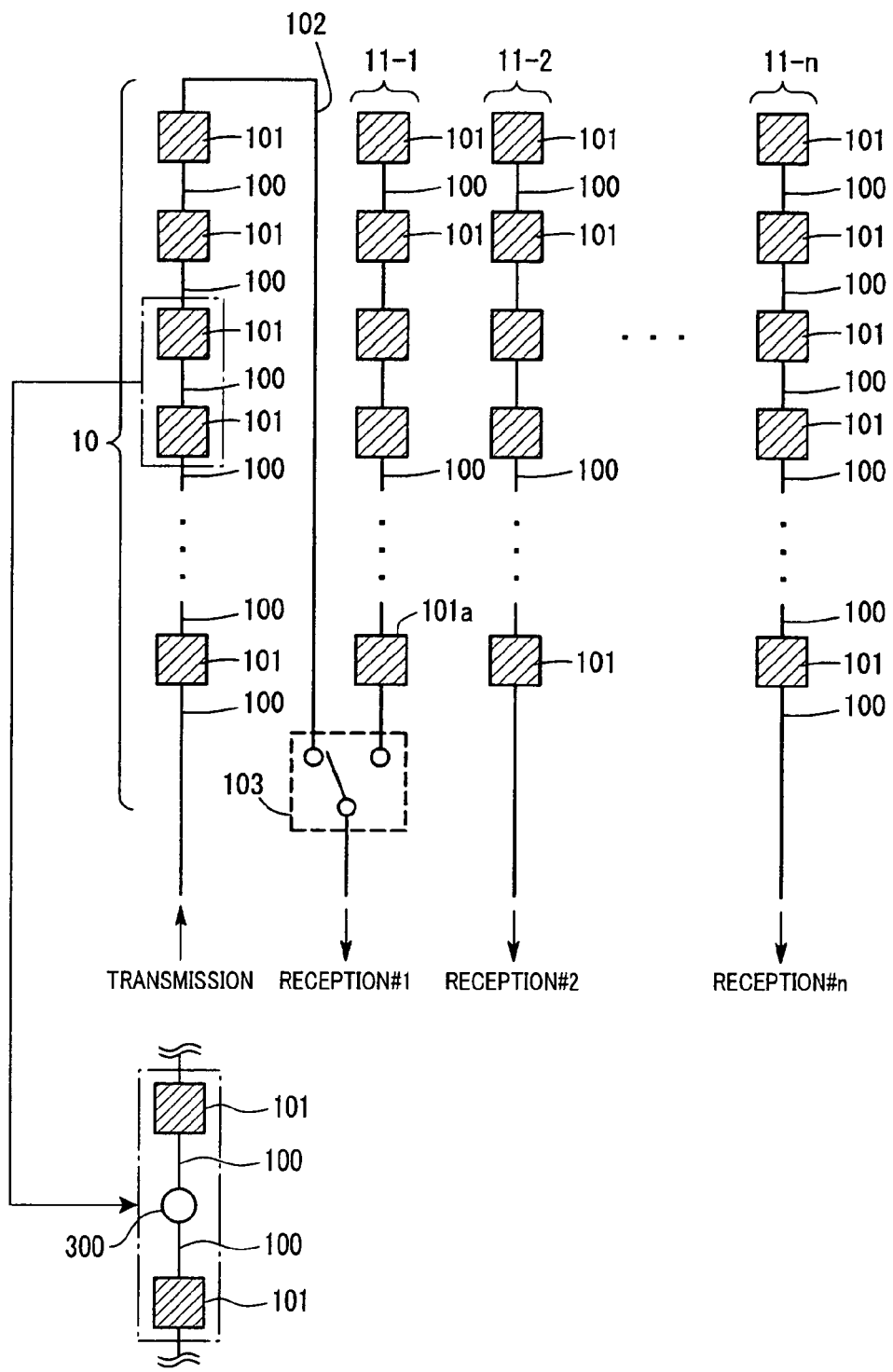
FIG. 2 is a block diagram showing an enlarge view of a transmission array-antenna and a reception array-antenna of the radar apparatus.
Figure 3:
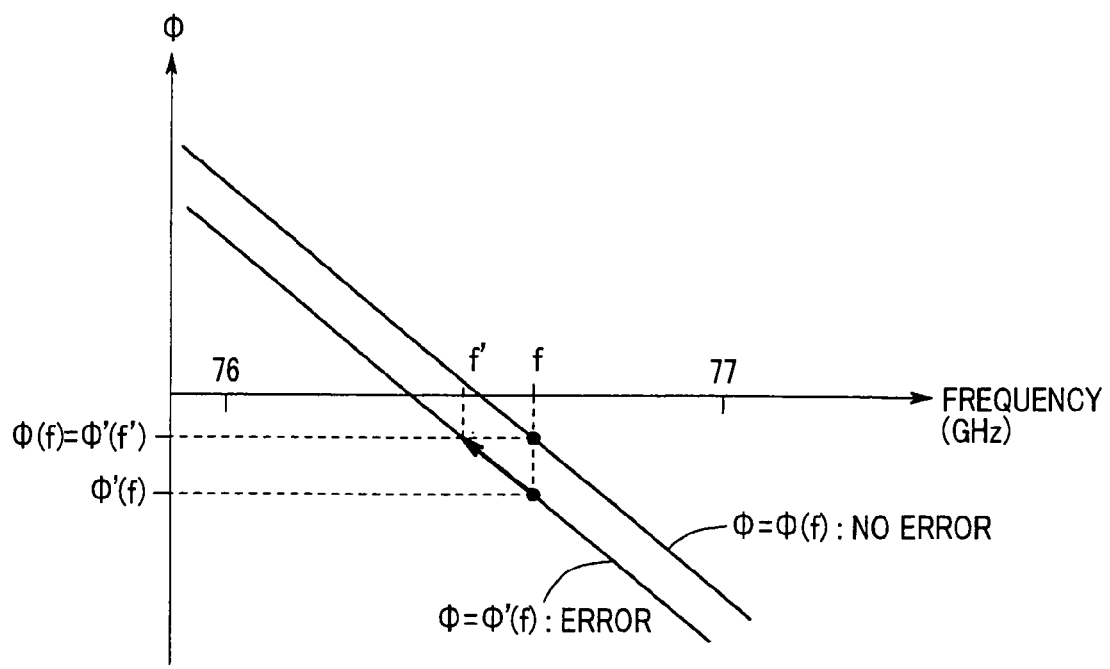
FIG. 3 is a graph showing a relationship between the frequency and an amount of phase shift.

With reference to FIGS. 1 to 3, hereinafter is described a first embodiment of the present invention.

FIG. 1 is a block diagram showing an overall configuration of a radar apparatus according to the first embodiment. The radar apparatus includes a transmission array-antenna 10, reception array-antennas 11-1 to 11-n, a signal processing circuit 12, D/A converter 113, a VCO (voltage control oscillator) 14, a directional coupler 15, mixers 16-1 to 16-n, a baseband circuits 17-1 to 17-n and a A/D converters 18-1 to 18-n. It is noted that n is a positive integral number showing the number of reception antennas and corresponding peripheral circuits.

The signal processing circuit 12 is connected to the VCO 14 via the D/A converter 13 and the VCO 14 is connected to the transmission array-antenna 10 via the directional coupler 15. The reception array-antennas 11-1 to 11-n are connected to the mixers 16-1 to 16-n respectively. These mixers 16-1 to 16-n are connected to the directional coupler 15 as well. The baseband circuits 17-1 to 17-n are connected to the output ends of the mixers 16-1 to 16-n. The baseband circuits 17-1 to 17-n are connected to the signal processing circuits 12 via the A/D converter 18-1 to 18-n.

FIG. 2 is a detailed block diagram showing configurations of the transmission array-antenna 10 and the reception array-antenna 11-1 to 11-n.

The transmission array-antenna 10 and the reception array-antennas 11-1 to 11-n is configured by a plurality of antenna elements 101 connected between feedlines 100 such that the antenna elements 101 is arranged between feedlines 100 with constant intervals. In other words, the antenna elements are connected in series by the feedlines 100. The transmission array-antenna 10 and the reception array-antennas 11-1 to 11-n constitutes a series-feed array-antenna in which one end of the feedline 100 is set as a feeding point or a receiving point. Further, a phase shifter 300 (optional) can be disposed between the antenna elements 101 (described later). The transmission array-antenna 10 and the reception array-antennas 11-1 to 11-n are arranged to be arrayed in the same direction and the respective antenna elements 101 are arranged to form a matrix with a constant interval therebetween. The reception array-antenna 11-1 to 11-n are arranged in order of a distance to the transmission array-antenna 10 so that the reception array-antenna 11-1 is disposed adjacently to the transmission array-antenna 10 and the reception array-antenna 11-2 is disposed next to the reception array-antenna 11-1 and other reception antennas 11-n are disposed according to the same manner.

The feedline 100 of the transmission array-antenna 10 is connected to a calibration line 102 at the end terminal (end portion of the opposite side of the feeding point side). A switch 103 is disposed between the receiving point of the reception array-antenna 11-1 that locates adjacent to the transmitting array-antenna 10 and an antenna element 101a which locates to be the nearest to the receiving point. The calibration line 102 and receiving point of the reception array-antenna 11-1 are connected by the switch 3. The switch 3 switches between a calibration mode and a normal mode. In the calibration mode, the calibration line 102 and the receiving point of the reception array-antenna 11-1 are connected and the receiving point of the reception array-antenna 11-1 and the antenna element 101a is disconnected. In the normal mode, a connection between the calibration line 102 and the receiving point of the reception array-antenna 11-1 is disconnected and the receiving point of the reception array-antenna 11-1 and the antenna element 101a are connected. The switching operation by the switch 102 is controlled by the signal processing circuit 12.

The transmission array-antenna 10 and the reception array-antenna 11-1 to 11-n can be designed by using any structures as long as it is designed as a series-feed antenna. For example, the feedline 100 can be configured by a microstrip line, a triplate line, a coplanar line and a waveguide tube. The shape of the feedline is not necessarily a straight line, but can be a curved line or a shape having a straight and curved line. Further, as to the antenna element 101, various types of antennas such as a rectangular or circular-shape patch antenna, a slot antenna, a dipole antenna and a combination of these antennas can be used.

The radar apparatus according to the first embodiment, the radar apparatus performs two modes of operations including the normal mode and the calibration mode. The two modes of operations are switched by the switch 103 which is controlled by the signal processing circuit 12. In the normal mode, the receiving point of the reception array-antenna 11-1 and the antenna element 101a are connected by the switch 103, and serving an essential function of the radar apparatus i.e., detecting a distance and a direction of the object to be measured. Meanwhile, in the calibration mode, the calibration line 102 and the receiving point of the reception array-antenna 11-1 are connected by the switch 103, and the connection between the receiving point of the reception array-antenna 11-1 and the antenna element 101a is disconnected, whereby a phase shift of the feeding in the respective antenna elements 101 is calibrated.

Hereinafter is described the operation of the normal mode. The VCO 14 generates a signal having a predetermined frequency (e.g. 76 to 77 GHz when it is used for an on-vehicle radar apparatus) based on a control signal inputted by the signal processing circuit 12 via the D/A converter 13. It is noted that the radar apparatus according to the present invention employs FM-CW (frequency modulated continuous wave) or CW (continuous wave) type of radar. The output signal from the VCO 14 is inputted to the transmission array-antenna 10 and the output signal is fed to each antenna element 101 of the transmission array-antenna 10. Each antenna element 101 radiates electromagnetic waves in which phase of the feeding (feeding-phase) between the antenna elements 101 varies depending on length of the feedline 100. Therefore, the radar beam having maximum gain in a predetermined direction is formed and transmitted from the transmission antenna.

The radar beam reflected at the object being measured is received by the respective reception array-antennas 11-1 to 11-n. The signals received by the reception array-antennas 11-1 to 11-n are mixed with signals from the directional coupler 15 at the mixers 16-1 to 16-n respectively whereby beat signals are generated. These beat signals are inputted to the baseband circuits 17-1 to 17-n and the noise component is removed from the beat signals. Subsequently, the beat signals are converted to digital beat signals at the A/D converters 18-1 to 18-n and are inputted to the signals processing circuit 12. In the signal processing circuit 12, the inputted digital beat signals are processed by a digital beat forming (DBF). As a result, location information about the object being measured is detected.

In the calibration mode, the signal reaching to the end terminal of the transmission array-antenna 10 is inputted to the receiving point of the reception array-antenna 11-1 via the calibration line 102 and then the signal is inputted to the mixer 16-1. The mixer 16-1 mixes the signal with a signal transmitted by the direction coupler 15 and generates the beat signal. Moreover, noise component in the beat signal is removed by the baseband circuit 17-1. The A/D converter 18-1 converts the beat signal to a digital beat signal which is inputted to the signal processing circuit 12. The input power to the reception array-antenna 11-1 is set to be small enough so as to avoid the mixer 16-1 being saturated. Hence, it is necessary to set the attenuation through the calibration line 102 to be larger so that the calibration line 102 may be folded to secure the length of the calibration line to be longer.

The signal processing circuit 12 calculates an amount of phase shift at the transmission array-antenna 10 based on the digital beat signal. The digital beat signal inputted to the signal processing circuit is based on the signal transmitted via the transmission array-antenna 10 and the calibration line 102 so that the amount of phase shift at the calibration line is already known (the amount of phase shift is stored in a memory of the signal processing circuit 12). Therefore, the phase shift $\phi'$ at the transmission array-antenna 10 can readily be calculated by subtracting the amount of phase shift at the calibration line 102 from the amount of phase shift obtained from the digital beat signal.

The amount of phase shift $\phi'$ is expressed as $\phi'(f)$ which is a single-valued function of frequency f of the signal outputted from the VCO 14. Also, the design value of the phase shift $\phi$ is expressed as $\phi(f)$ which is a single-valued function of the frequency f as well. Since the design value of the phase shift $\phi$ is stored in the memory connected to the signal processing circuit 12, a frequency f' defined as $\phi'(f')=\phi(f)$ is present (Refer to FIG. 3). Therefore, the VCO 14 is controlled to change the frequency of the signal from f to f' whereby the phase shift can be corrected to the designed value $\phi$.

The frequency f' is determined such that an amount of phase shift $\phi'$ is calculated while the frequency of the signal is varied and determined a frequency corresponding to the designed value $\phi$ to be f', or it is estimated $\phi'(f)$ in advance and stores the estimated $\phi'(f)$ and f' may be calculated from the equation $\phi'(f')=\phi(f)$. Since the amount of phase shift is measured by using a plurality of frequencies, an effect of phase folding can be reduced. As a result, the accuracy of the calibration can be enhanced. Further, a modulation period can be switched between the normal mode and the calibration mode to detect the phase shift such that the modulation period is set to be longer when in the calibration mode thereby detecting the phase shift $\phi'$ easily.

Thus, in the calibration mode, the signal processing circuit 12 controls the frequency of the signal outputted by the VCO 14 to be varied so that the phase shift $\phi'$ is corrected to the designed value $\phi$. As a result, the phase shift of the feeding in each antenna element 101 is corrected so that the direction of the radar beam (peak direction of the gain) can be calibrated as the designed direction.

In the calibration mode, the reception array-antenna 11-2 to 11-n serve as a normal mode to receive the radar beam reflected at an object to be measured. Accordingly, in the calibration mode, the signal processing circuit 12 corrects the phase shift of the feeding in the antenna element 101 whereby the direction of the radar beam (i.e., direction-shift of the radar beam) is calibrated, and at the same time, signals received by the reception array-antennas 11-2 to 11-n are processed to detect the location of the object to be measured.
(Second Embodiment)

Figure 4:
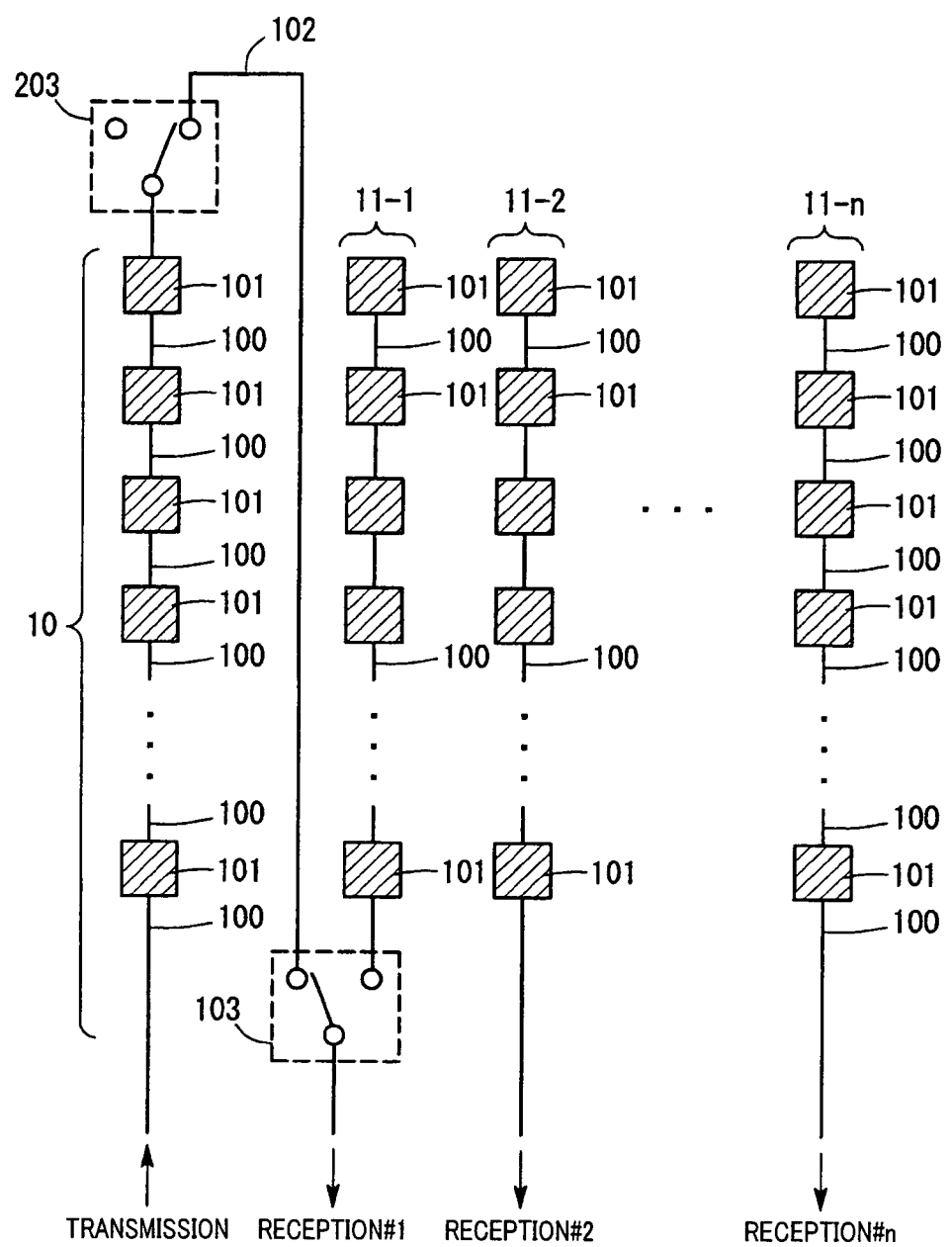
FIG. 4 is a block diagram showing a configuration of the radar apparatus according to a second embodiment.
Figure 5:
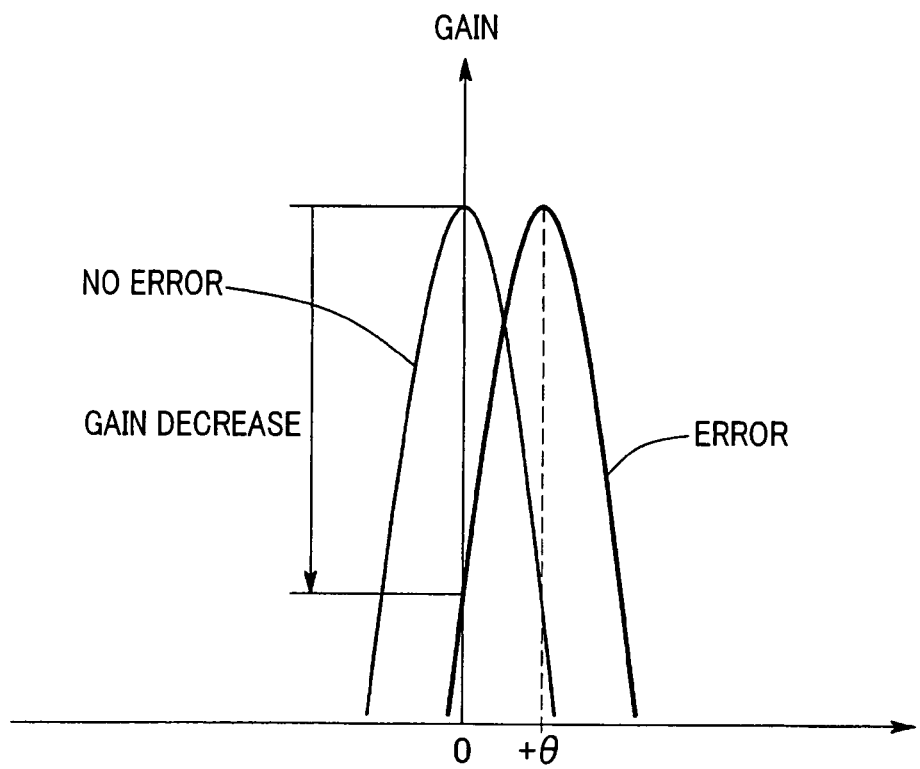
FIG. 5 is an explanatory diagram showing a direction-shift of the radar beam.

The radar apparatus according to the second embodiment, as shown in FIG. 4, it is configured that a switch 203 is further disposed between the end terminal of the feedline 100 of the transmission array-antenna 100 and the calibration line 102.

The switch 203 can switch a connection between the end terminal of the feedline 100 of the transmission array-antenna 10 and the calibration line 102 to be ON and OFF. Specifically, when the radar apparatus operates in the normal mode, the switch 203 disconnects the transmission array-antenna 10 from the calibration line 102 whereby radiating the electromagnetic waves from the calibration line can be suppressed when it is in the normal operation. As a result, a characteristic of the radar apparatus can be suppressed from being degraded as well.

According to the first and second embodiments, the VCO 14 changes the frequency of the signal thereby correcting the phase shift. However, the signal processing circuit 12 calculates the phase shift such that an amount of shift $\delta'$ ($=\phi'-\phi$) from the phase shift $\phi'$ based on the reference value $\phi$ is calculated and the signal processing circuit 12 may calibrate the amount of shift $\delta'$ by using a phase shifter 300 directly. When a phased array-antenna having the transmission array-antenna 10, the reception array-antenna 11-1 to 11-n and the phase shifters 300 disposed between the antenna elements 101 is employed for the radar apparatus, the calibration can be processed as follows. First, the signal processing circuit 12 calculates the amount of shift $\delta'$ from the reference value $\phi$ and estimates an amount of phase shift $\delta$ of the feeding at the respective antenna elements 101 of the transmission array-antenna 10. Specifically, when assuming the line length of the transmission array-antenna 10 is L and the distance between antenna elements 101 is d and an amount of phase shift of the feeding 6 from the designed value is the same between the respective antenna elements 101, the amount of phase shift $\delta$ can be calculated by an equation $\delta=\delta'*d/L$. Therefore, this amount of phase shift $\delta$ can be set to the value of phase shift in each phase shifter 300 disposed between the antenna elements 101 so that the calibration of the phased array-antenna can be accomplished. It is noted that the phase shifter 300 can be configured by a semiconductor device, a MEMS (micro-electric-mechanical system), a ferroelectric material and a liquid crystal material.

The signal processing circuit 12 according to the first and second embodiments can employ the above-described procedure to obtain the phase shift $\delta$ and calculates an error at a direction of the radar beam (direction-shift) by using an equation $\theta=\arccos(-\delta/(kd))$ thereby calibrating the error by the signal processing. As a result, accuracy for detecting the location of the object can be enhanced. Here, $\theta$ is defined based on a condition that the direction of the radar beam is 0 deg when no phase-error is detected and k is the number of waves at frequency f. Further, the calibration of the phase shift by changing of the signal-frequency or changing of the amount of phase at the phase shifter 300 can be made simultaneously with the calibration for the direction of the radar beam performed by the signal processing. Also, the calibration of the phase shift can be made before/after the calibration for the direction of the radar beam.

The connection points of the calibration line 102 is not limited to the configuration of the first and second embodiments, however, various modification can be made. For example, the calibration line 102 can be arranged to include at least one antenna element 101 in the signal path i.e., the feeding point of the transmission array-antenna 10 to the connection point between the transmission array-antenna 10 and the calibration line 102, the calibration line 102, the connection point between the calibration-line 102 and the reception array-antenna 11-1, and the receiving point of the reception array-antenna 11-1. The connection point of the calibration line 102 can be arranged to any portion considering influence of radiation from the calibration line itself, phase folding, intensity of the reception signal and the like. Moreover, when a switch is arranged to connect/disconnect (electrically conduct/break) the calibration line 102, the switch can be arranged to any portion considering various possible influences.

According to the first and second embodiments, the calibration line 102 is connected to the reception array-antenna 11-1. However, the calibration line 102 can be connected to any one of other reception antennas 11-2 to 11-n. When the length of the calibration line 102 becomes longer, the characteristics of the radar apparatus may be influenced by electromagnetic waves radiating from the calibration line 102. Therefore, since designing the layout of the lines in the array-antenna may become complicated, it is preferable to configure the calibration line to be connected to the reception array-antenna 11-1 which is the closest to the transmission array-antenna 10. It is noted that the present invention is not limited to the above-described embodiments. However, various modifications can be made within a scope of the present invention.

What is claimed is:

1. A radar apparatus forming a series-feed array-antenna, operating in either a normal mode or a calibration mode, the radar apparatus comprising:

a voltage controlled oscillator that changes frequency of a signal to be transmitted from the series-feed array-antenna, the frequency of the signal being changed within a modulation period;

an array antenna having a transmission antenna and a reception antenna, each antenna including a plurality of antenna elements arrayed with a feedline electrically connected therebetween, thereby constituting the series-feed array-antenna, wherein the transmission antenna radiates the signal from respective antenna elements having mutually different feeding phases among the respective antenna elements so as to generate a radar beam;

a calibration line connected between a connection point at the feedline of the transmission antenna and a connection point at the feedline of the reception antenna;

a switch connected between the transmission antenna and the reception antenna to connect or disconnect the calibration line therebetween, the signal having a phase shift being transmitted via the calibration line when the switch connects the calibration line, the switch connecting the calibration line between the transmission antenna and the reception antenna when the radar apparatus operates in the calibration mode;

means for calculating an amount of phase shift from the signal transmitted via the calibration line based on a reference phase at the transmission antenna; and means for calibrating the phase shift calculated by the calculating means and the calibration means is configured to convert the phase shift to be a frequency-shift and enables the voltage controlled oscillator to control the frequency of the signal being transmitted by the transmission antenna so as to perform the calibration, wherein the calibration line is connected between the connection points so as to include at least one antenna element in a signal path from a feeding point on the feedline in the transmission antenna to the connection point on the feedline in the transmission antenna and a signal path from the connection point at the feedline in the reception antenna to a feeding point at the feedline in the reception antenna, the modulation period in the calibration mode is set to be longer than that in the normal mode.

2. The radar apparatus according to claim 1, wherein the switch is disposed at a connection end of the calibration line at the transmission antenna and a connection end of the calibration line at the reception antenna.

3. The radar apparatus according to claim 1, wherein the radar apparatus includes means for estimating a phase shift at the antenna elements based on the amount of phase shift calculated by the calculating means and means for detecting a direction-shift of the radar beam.

4. The radar apparatus according to claim 2, wherein the radar apparatus includes means for estimating a phase shift at the antenna elements based on the amount of phase shift calculated by the calculating means and means for detecting a direction-shift of the radar beam.

5. The radar apparatus according to claim 2, wherein the radar apparatus includes a voltage controlled oscillator that changes frequency of the signal, and the calibrating means is configured to convert the phase shift calculated by the calculating means to a frequency-shift and control the frequency of the signal being transmitted by the transmission antenna by the voltage controlled oscillator so as to perform the calibration.

6. The radar apparatus according to claim 1, wherein the transmission antenna and the reception antenna is configured by a phased array-antenna in which phase shifters are disposed between the antenna elements, and the radar apparatus includes means for estimating a phase shift of the feeding at the antenna elements based on the amount of phase shift calculated by the calculating means, and the calibrating means calibrates the phase shift of the feeding by changing an amount of phase shift of the phase shifters.

7. The radar apparatus according to claim 2, wherein the transmission antenna and the reception antenna is configured by a phased array-antenna in which phase shifters are disposed between the antenna elements, and the radar apparatus includes means for estimating a phase shift of the feeding at the antenna elements based on the amount of phase shift calculated by the calculating means, and the calibrating means calibrates the phase shift of the feeding by changing an amount of phase shift of the phase shifters.

8. The radar apparatus according to claim 6, wherein the phase shifters are configured by at least one of a semiconductor device, MEMS, ferroelectric material and liquid crystal material.

9. The radar apparatus according to claim 1, wherein the feedlines of the transmission antenna and the reception antenna are configured by at least one of a microstrip line, a triplate line, a coplanar line and a waveguide tube.

10. The radar apparatus according to claim 2, wherein the feedlines of the transmission antenna and the reception antenna are configured by at least one of a microstrip line, a triplate line, a coplanar line and a waveguide tube.

11. The radar apparatus according to claim 1, wherein the antenna element used in the transmission antenna and the reception antenna is configured by a patch antenna or a slot antenna or a dipole antenna.

\* \* \* \* \*